(12) United States Patent
Jung

(10) Patent No.: US 8,866,697 B2
(45) Date of Patent: Oct. 21, 2014

(54) DISPLAY DEVICE AND MOBILE DEVICE INCLUDING DISPLAY DEVICE

(75) Inventor: Soon-Shin Jung, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 1737 days.

(21) Appl. No.: 11/288,337

(22) Filed: Nov. 29, 2005

(65) Prior Publication Data

US 2006/0208993 A1   Sep. 21, 2006

(30) Foreign Application Priority Data

Dec. 8, 2004  (KR) .................. 10-2004-0102793

(51) Int. Cl.
*G09G 5/00* (2006.01)

(52) U.S. Cl.
USPC ........................................................... 345/1.1

(58) Field of Classification Search
USPC .............. 345/1.1, 1.3; 715/761, 815
See application file for complete search history.

(56) References Cited

U.S. PATENT DOCUMENTS

| | | | |
|---|---|---|---|
| 4,712,799 A * | 12/1987 | Fraley | 463/20 |
| 4,746,981 A * | 5/1988 | Nadan et al. | 348/581 |
| 2002/0180725 A1* | 12/2002 | Simmonds et al. | 345/213 |
| 2004/0080482 A1* | 4/2004 | Magendanz et al. | 345/100 |
| 2004/0150581 A1* | 8/2004 | Westerinen et al. | 345/1.3 |
| 2004/0201544 A1* | 10/2004 | Love et al. | 345/1.1 |
| 2005/0190165 A1* | 9/2005 | Wendling | 345/204 |
| 2006/0055626 A1* | 3/2006 | Tremblay | 345/2.2 |

FOREIGN PATENT DOCUMENTS

| | | |
|---|---|---|
| CN | 1264054 A | 8/2000 |
| CN | 1391203 A | 1/2003 |
| CN | 1551064 A | 2/2004 |
| CN | 1512474 A | 7/2004 |
| JP | 2003-153128 A | 5/2003 |

* cited by examiner

*Primary Examiner* — Dennis Joseph
(74) *Attorney, Agent, or Firm* — Birch, Stewart, Kolasch & Birch, LLP

(57) ABSTRACT

A display device includes a timing controller for generating a plurality of gate signals and a plurality of data signals associated with at least one image; and a plurality of display panels controlled by the timing controller for receiving the corresponding gate signals and data signals from the timing controller.

13 Claims, 6 Drawing Sheets

DISPLAY DEVICE AND MOBILE DEVICE INCLUDING DISPLAY DEVICE

This Nonprovisional Application claims priority under 35 U.S.C. §119(a) on Patent Application No. 10-2004-0102793 filed in Korea on Dec. 8, 2004, the entire contents of which are hereby incorporated by reference.

BACKGROUND OF THE INVENTION

1. Field of the Invention

The present invention relates to a display device and a mobile device using the display device, and more particularly, to a mobile device including display panels and a timing controller supplying signals to the display panels.

2. Discussion of the Related Art

Flat panel display (FPD) devices having portability and low power consumption have been the subjects of recent research and development since the coming of the information era. Specifically, a liquid crystal display (LCD) device, a plasma display panel (PDP) device, an electroluminescent display (ELD) device and a vacuum fluorescent display (VFD) device have been developed as FPD devices. Among the various types of FPD devices, liquid crystal display (LCD) devices are widely used as monitors for notebook computers and desktop computers instead of cathode ray tube (CRT) because of their high resolution, color quality and superior image movement.

In general, an LCD device includes a first substrate, a second substrate and a liquid crystal layer between the first and second substrates. Electrodes are formed on inner surfaces of the first and second substrates, and an electric field is generated between the electrodes when a voltage is applied. The LCD device uses the optical anisotropy and polarization properties of liquid crystal molecules to produce an image. Due to the optical anisotropy of the liquid crystal molecules, refraction of light incident onto the liquid crystal molecules depends upon the alignment direction of the liquid crystal molecules. The liquid crystal molecules have long thin shapes that can be aligned along specific directions. The alignment direction of the liquid crystal molecules can be controlled by applying the electric field generated between electrodes on the first and second substrates. Accordingly, the alignment of the liquid crystal molecules changes in accordance with the direction of the applied electric field. Thus, by properly controlling the electric field applied to a group of liquid crystal molecules within respective pixel regions, a desired image can be produced by appropriately modulating transmittance of the incident light.

There are several types of LCD devices, one of which is commonly referred to as active matrix LCD (AM-LCD) device. The AM-LCD device includes an array of pixels forming a matrix. Each of the pixels in the AM-LCD device includes a thin film transistor (TFT) and a pixel electrode. The AM-LCD devices are currently being developed because of their high resolution and superior quality for displaying moving pictures.

An LCD device displays images using the RGB data and several control signals transmitted from an external driving system. A low voltage differential signaling (LVDS) interface is used for a high-speed data transmission between the LCD device and the external driving system.

FIG. 1 is a schematic block diagram showing a liquid crystal display device and an external driving system according to the related art. In FIG. 1, an external driving system includes a graphic card 10 having a low voltage differential signaling (LVDS) transmitting portion 12 and an interface board 14 having an LVDS receiving portion 16, and a liquid crystal display device includes a timing controller 20, a gate driver 22 and a data driver 26 and a liquid crystal display panel 30. For example, the external driving system may include a computer body. The graphic card 10 transmits the RGB data and control signals of a transistor transistor logic (TTL) type to the LVDS transmitting portion 12. The control signals may include a data enable signal, a horizontal sync signal, a vertical sync signal and a system clock. The RGB data and the control signals are converted into communication signals of an LVDS type in the LVDS transmitting portion 12. The communication signals are transmitted to the LVDS receiving portion 16 of the interface board 14. The communication signals are re-converted into the RGB data and the control signals of a TTL type in the receiving portion 16. The RGB data and the control signals of a TTL type are transmitted to the timing controller 20. The timing controller 20 determines a timing format for the RGB data and the control signals of a TTL type, and generates a data signal and a gate signal. The data signal and the gate signal are transmitted to the data driver 26 and the gate driver 22, respectively.

The liquid crystal display panel 30 includes first and second substrates facing and spaced apart from each other. A plurality of gate lines 24 and a plurality of data lines 28, which are connected to the gate driver 22 and the data driver 26, respectively, are formed on the first substrate. The gate line 24 crosses the data line 28 to define a pixel region "P," and a thin film transistor (TFT) "T" is connected to the gate line 24 and the data line 28. A pixel electrode connected to the TFT "T" is formed in the pixel region "P." A black matrix (not shown) having an open portion, a color filter layer in the open portion and a common electrode on the color filter layer are formed on the second substrate. A liquid crystal layer between the pixel electrode and the common electrode constitutes a liquid crystal capacitor "Clc" with the pixel electrode and the common electrode. As a result, the gate signal of the timing controller 20 is transmitted to the plurality of gate lines 24 through the gate driver 22 and the data signal of the timing controller 20 is transmitted to the plurality of data lines 28 through the data driver 26.

When the TFT is turned on by the gate signal applied to the selected gate line 24, the liquid crystal capacitor "Clc" is charged by the data signal applied to the corresponding data line 28. Accordingly, the alignment direction of the liquid crystal molecules is changed in accordance with the data signal, thereby changing transmittance of the pixel region. Since the liquid crystal is not a self-emissive material, a backlight unit supplying light is disposed under the liquid crystal display panel 30 as a light source. As a result, the liquid crystal display panel 30 displays various images due to variance of transmittance and combination of colors through the color filter layer.

Recently, a multi-monitor where at least two LCD devices are connected to a single graphic card has been suggested due to the significant increase of information to be displayed. In the multi-monitor, different images are respectively displayed in the at least two LCD devices. A dual monitor having two LCD devices will be illustrated hereinafter as an example.

FIG. 2 is a schematic block diagram showing a dual monitor according to the related art. In FIG. 2, a dual monitor includes an external driving system and two liquid crystal display devices. The external driving system includes a graphic card 10 having first and second low voltage differential signaling (LVDS) transmitting portions 12a and 12b, a first interface board 14a having a first LVDS receiving portion 16a, and a second interface board 14b having a second LVDS receiving portion 16b. The first liquid crystal display device connected to the first interface board 14a includes a first timing controller 20a, a first gate driver 22a and a first data driver 26a and a first liquid crystal display panel 30a. The second liquid crystal display device connected to the second interface board 14b includes a second timing controller 20b, a second gate driver 22b and a second data driver 26b and a second liquid crystal display panel 30b.

As shown in the dual monitor according to the related art, two interface boards 16a and 16b and two LCD devices are independently connected to the single graphic card 10. Accordingly, a dual monitor has several limitations. First, since two interface boards and two LCD devices having the same structure are used, a large size is required. Even though the substantial object of a dual monitor is to display more information in a smaller area, it is not effective due to the size increase, and a structure becomes complicated due to the individual interface boards and LCD devices. Second, two LCD devices do not perfectly display a single image as a whole. In a dual monitor according to the related art, individual RGB data and control signals are transmitted to the first and second timing controllers 20a and 20b from independent first and second LVDS transmitting portions 12a and 12b of the graphic card 10. Accordingly, the two LCD devices display may different images unless the graphic card includes a specific application for synchronization. A tiled LCD device where a plurality of liquid crystal display panels display a single image has been suggested. However, individual sub-images for the single image are displayed using individual RGB data and control signals in the tiled LCD device. As a result, the tiled LCD device has some disadvantages such as delays between frames and abnormality in picture change. In addition, duplicate high cost circuit elements such as timing controllers are required, and display quality is deteriorated due to separation of image.

SUMMARY OF THE INVENTION

Accordingly, the present invention is directed to a liquid crystal display device and a mobile device using a liquid crystal display device that substantially obviates one or more of the problems due to limitations and disadvantages of the related art.

An advantage of the present invention is to provide a liquid crystal display device that displays a better image throughout liquid crystal display panels as a whole, and a mobile device using the liquid crystal display device.

Another advantage of the present invention is to provide a liquid crystal display device where a single timing controller transmits gate signals and data signals to liquid crystal display panels, and a mobile device using the liquid crystal display devices.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes: a graphic card for outputting RGB data and control signals for at least one image; a timing controller for converting the RGB data and the control signals into a plurality of gate signals and a plurality of data signals; and a plurality of display panels controlled by the timing controller for receiving the corresponding gate signals and data signals from the timing controller, the at least one image being displayed by a combined display area of the plurality of display panels as a whole.

In another aspect, a mobile device having a liquid crystal display device includes: a body having an input device; a plurality of display units connected to the body, the plurality of display units connected to each other and movable with respect to each other; a graphic card for outputting RGB data and control signals for at least one image; a timing controller for converting the RGB data and the control signals into a plurality of gate signals and a plurality of data signals; and a plurality of display panels controlled by the timing controller for receiving the gate signals and data signals from the timing controller, wherein the plurality of display panels are disposed in the plurality of display units, respectively, and the at least one image is displayed by a combined display area of the plurality of display panels as a whole.

In another aspect, a display device includes a timing controller for generating a plurality of gate signals and a plurality of data signals associated with at least one image; and a plurality of display panels controlled by the timing controller for receiving the corresponding gate signals and data signals from the timing controller.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, similar reference numbers will be used to refer to the same or similar parts.

A mobile device according to the present invention can be embodied as one of a cellular phone, a notebook computer, a personal digital assistant (PDA), a navigation device, a digital camera, a digital camcorder, and a small-sized television application for vehicles or the like. Other applications of the mobile device according to the present invention are also possible and contemplated in the present invention.

Figure 1:
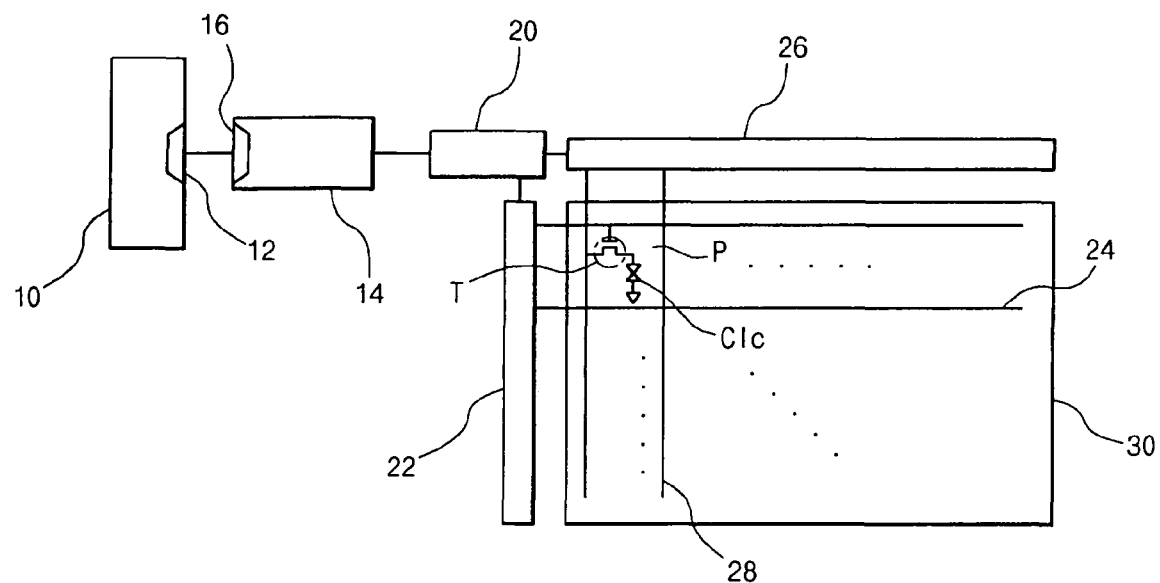
FIG. 1 is a schematic block diagram showing a liquid crystal display device and an external driving system according to the related art.
Figure 2:
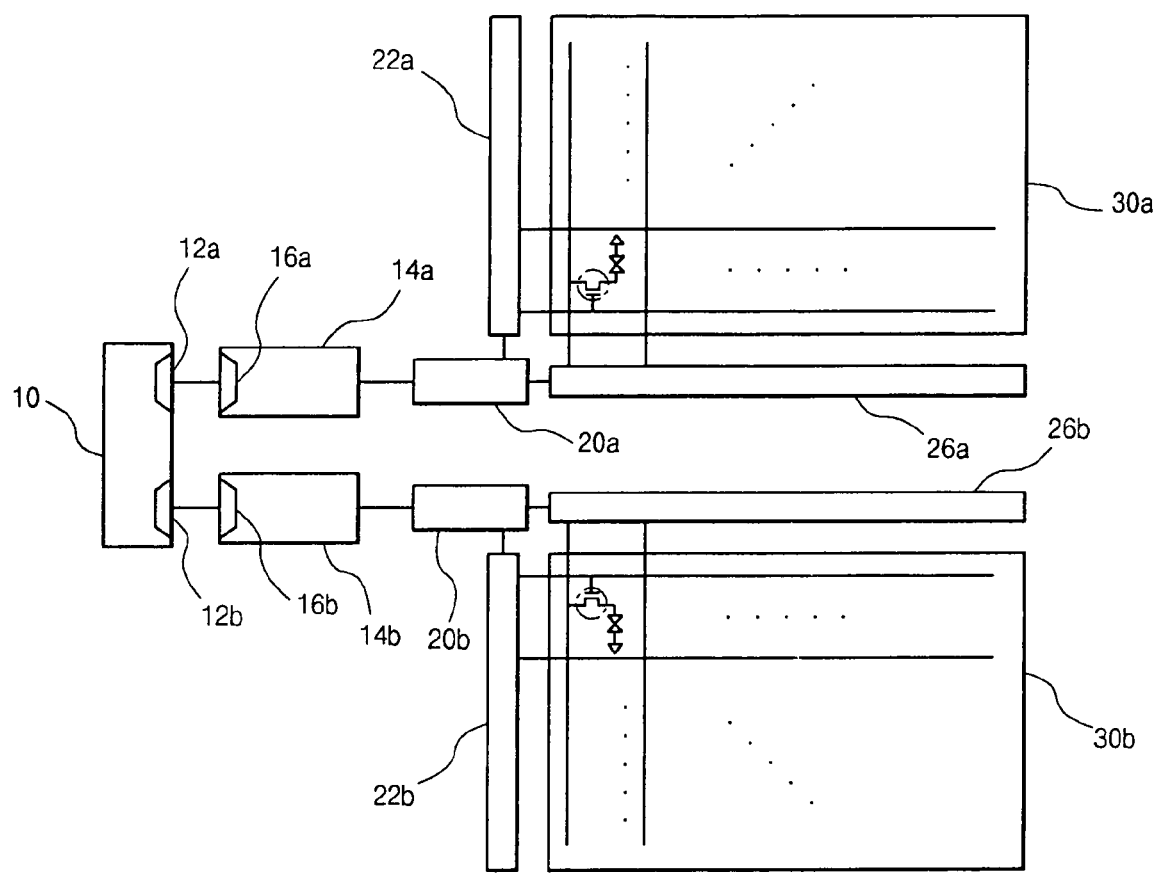
FIG. 2 is a schematic block diagram showing a dual monitor according to the related art.
Figure 3:
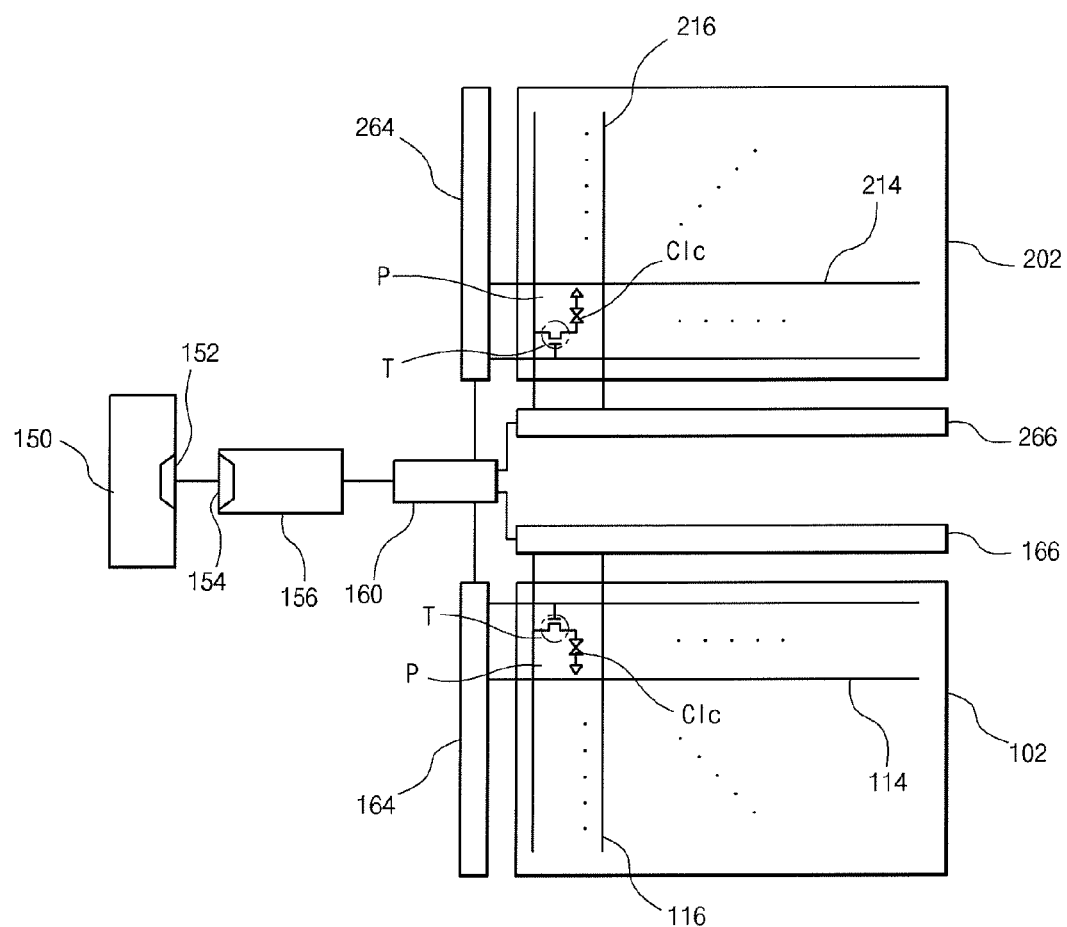
FIG. 3 is a schematic block diagram showing a liquid crystal display device and an external driving system according to an embodiment of the present invention.

FIG. 3 is a schematic block diagram showing a liquid crystal display device and an external driving system according to an embodiment of the present invention. As an example, a liquid crystal display device including first and second liquid crystal display panels will be illustrated. It should be noted that the present invention can also apply to any device having two or more liquid crystal display panels or other types of display panels.

In FIG. 3, an external driving system includes a graphic card 150 and an interface board 154, and a liquid crystal display device includes a first liquid crystal display panel 102, a second liquid crystal display panel 202 and a timing controller 160 for either selectively or simultaneously controlling the first and second liquid crystal display panels. The graphic card 150 has a low voltage differential signaling (LVDS) transmitting portion 152 and the interface board 156 has an LVDS receiving portion 154. A first gate driver 164 and a first data driver 166 is connected to the first liquid crystal display panel 102, and a second gate driver 264 and a second data driver 266 are connected to the second liquid crystal display panel 202. In addition, the interface board 156, the first gate driver 164, the first data driver 166, the second gate driver 264 and the second data driver 266 are connected to the single timing controller 160.

For example, the external driving system may include a computer. The graphic card 150 transmits the RGB data and control signals of a transistor transistor logic (TTL) type to the LVDS transmitting portion 12. The RGB data has color information for an image, and the control signals include a data enable signal (DE), a horizontal sync signal (HSYNC), a vertical sync signal (VSYNC) and a system clock (SCLK). The RGB data and the control signals are converted into communication signals of an LVDS type in the LVDS transmitting portion 152. The communication signals are transmitted to the LVDS receiving portion 154 of the interface board 156. The communication signals are re-converted into the RGB data and the control signals of a TTL type in the receiving portion 154. The RGB data and the control signals of a TTL type are transmitted to the timing controller 160. The timing controller 160 determines a timing format for the RGB data and the control signals of a TTL type, and generates data signals and gate signals. The data signals are transmitted to the first and second data drivers 166 and 266, and the gate signals are transmitted the first and second gate drivers 164 and 264.

Figure 4:
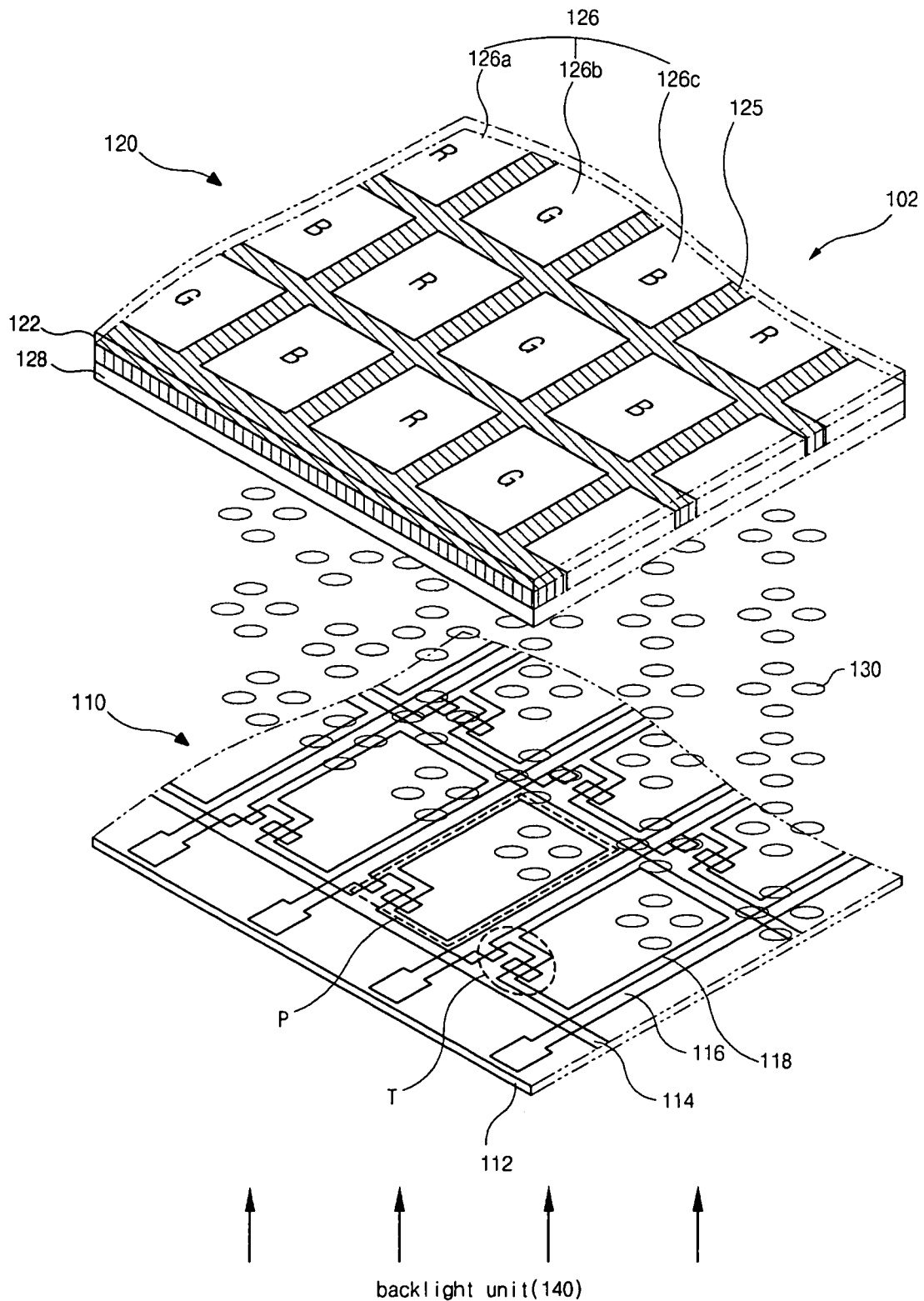
FIG. 4 is a schematic exploded perspective view showing a first liquid crystal display panel for a liquid crystal display device according to an embodiment of the present invention.

Since the first liquid crystal display panel 102 has the same structure as the second liquid crystal display panel 202, the first liquid crystal display panel 102 will be illustrated as an example. FIG. 4 is a schematic exploded perspective view showing a first liquid crystal display panel for a liquid crystal display device according to an embodiment of the present invention.

In FIG. 4, a first liquid crystal display panel 102 includes a first substrates 110, a second substrate 120 and a liquid crystal layer 130 between the first and second substrates 110 and 120. The first and second substrates 110 and 120 are spaced apart from each other. The first substrate 110 is referred to as a lower substrate or an array substrate, and the second substrate 120 is referred to as an upper substrate or a color filter substrate.

A gate line 114 and a data line 116 are formed on an inner surface of the first substrate 110. The gate line 114 and the data line 116 cross each other to define a pixel region "P." and a thin film transistor (TFT) "T" is connected to the gate line 114 and the data line 116. The TFT "T" includes a gate electrode connected to the gate line 114, a source electrode connected to the data line 116, a drain electrode spaced apart from the source electrode, and a semiconductor layer through which carriers such as electrons and holes pass. A pixel electrode 118 of a transparent conductive material is connected to the TFT "T" and is disposed in each pixel region "P."

A black matrix 125 and a color filter layer 126 are formed on an inner surface of the second substrate 120. The black matrix 125 covers the gate line 114, the data line 116 and the TFT "T" of the first substrate 110, which correspond to portions not driving the liquid crystal layer 130, and has openings in the matrix exposing the pixel electrode 118. The color filter layer 126 includes red, green and blue sub-color filters 126a, 126b and 126c sequentially disposed in the openings. A common electrode 128 of a transparent conductive material is formed on the black matrix 125 and the color filter layer 126.

Even though not shown in FIG. 3, first and second polarizing films may be formed on outer surfaces of the first and second substrates 110 and 120, respectively. Moreover, alignment layers may be formed on the pixel electrode 118 and the common electrode 128, respectively. The alignment direction of the liquid crystal layer may be determined by the alignment layers.

The pixel electrode 118 and the common electrode 128 facing each other constitute a liquid crystal capacitor "Clc" with the liquid crystal layer 130 interposed therebetween. A data signal, which is referred to as a charging signal or a driving signal, is applied to the data line 116 from a data driver 166. In addition, a gate signal that controls a state of a TFT "T" is applied to the gate line 114 from the gate driver 164. Even though not shown in FIG. 4, a storage capacitor may be connected to the TFT "T" in parallel with the liquid crystal capacitor "Clc" to solve the problems caused by a parasitic capacitance. Accordingly, the TFT "T" functions as a switch that supplies the data signal transmitted from the data driver 166 through the data line 116 to the liquid crystal capacitor "Clc" according to the gate signal transmitted from the gate driver 164 through the gate line 114. A voltage difference between the pixel electrode 118 and the common electrode 128 is caused by the data signal.

Since the liquid crystal display panel 102 does not have an emissive element, a backlight unit 140 is disposed under the first substrate 110 to provide light to the liquid crystal display panel 102. The backlight unit 140 may include a light guide plate and a plurality of optical sheets to improve uniformity and quality of light. An alignment direction of liquid crystal molecules and a transmittance of the liquid crystal layer 130 are changed due to a voltage difference between the pixel electrode 118 and the common electrode 128. The liquid crystal display panel 102 displays various images by the transmittance difference of light from the backlight unit 140 and a combination of red, green and blue sub-color filters 126a, 126b and 126c.

When polycrystalline silicon is used for the semiconductor layer, the liquid crystal display panel 102 may have a chip on glass (COG) structure where the gate driver 164 and the data driver 166 are formed on the first substrate 110. In addition, the liquid crystal display panel 102 may have a chip on film (COF) structure where the gate driver 164 and the data driver 166 are formed on a flexible printed circuit (FPC) board connected to the gate line 114 and the data line 116.

Referring again to FIG. 3, the RGB data and the control signals are transmitted from the interface board 156 to the timing controller 160. The timing controller 160 reorganizes the RGB data and the control signals such that the first and second liquid crystal display panels 102 and 202 display a single image by the RGB data and the control signals as a whole. In addition, the timing controller 160 generates a first gate signal and a first data signal for the first liquid crystal display panel 102, and a second gate signal and a second data signal for the second liquid crystal display panel 202. The first gate signal and the first data signal are used to display a portion of the single image, and the second gate signal and the second data signal are used to display the other portion of the single image. The first gate signal and the first data signal are transmitted to the first gate driver 164 and the first data driver 166, respectively. Similarly, the second gate signal and the second data signal are transmitted to the second gate driver 264 and the second data driver 266, respectively.

Figure 5:
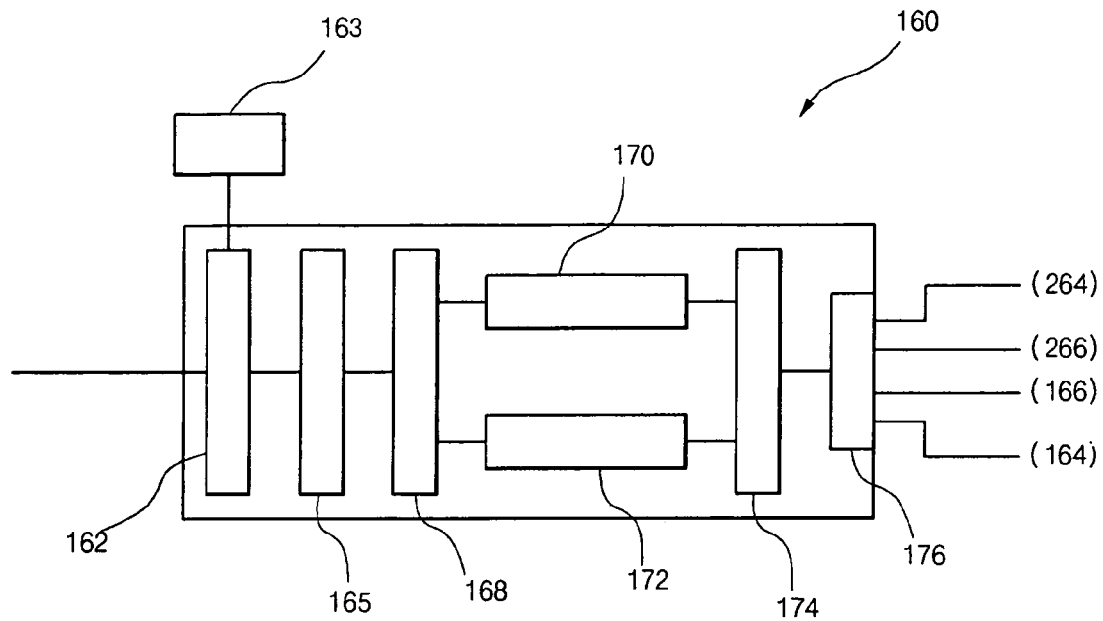
FIG. 5 is a schematic block diagram showing a timing controller for a liquid crystal display device according to an embodiment of the present invention.

Structure and operation of the timing controller 160 will be illustrated with a drawing. FIG. 5 is a schematic block diagram showing a timing controller for a liquid crystal display device according to an embodiment of the present invention.

In FIG. 5, the timing controller 160 includes a transmission judging unit 162, a reference signal generating unit 163, a scaling unit 165, a dividing unit 168, a data signal generating unit 170, a gate signal generating unit 172, a timing controlling unit 174 and a panel selecting unit 176. The reference signal generating unit 163 supplies a reference signal having a predetermined frequency to the transmission judging unit 162, and the transmission judging unit 162 judges the transmission of the RGB data and the control signals from the interface board 156 (of FIG. 3) by using the reference signal. When the RGB data and the control signals are correctly transmitted from the interface board 156 (of FIG. 3), the RGB data and the control signals are transmitted to the scaling unit 165.

The scaling unit 165 converts a single image by the RGB data and the control signals such that the first and second liquid crystal display panels 102 and 202 display the single image as a whole. Accordingly, the scaling unit 165 expands the single image into a whole area of the first and second liquid crystal display panels 102 and 202. The RGB data and the control signals may increase and decrease during the conversion. For example, the image by the RGB data and the control signals of the graphic card 150 (of FIG. 3) may have a resolution of 800×600, and each of the first and second liquid crystal display panels 102 and 202 may have a resolution of 800×600. Since the entire first and second liquid crystal display panels 102 and 202 have a resolution of 1600× 600, the RGB data increases by duplication to fit 1600 pixels and the control signals is divided to fit the first and second liquid crystal display panels 102 and 202.

The dividing unit 168 divides the converted single image into sub-images for the first and second liquid crystal display panels 102 and 202. For example, when the first and second liquid crystal display panels 102 and 202 have the same size and the same resolution, the converted single image may be halved. The data signal generating unit 170 generates a first data signal for the first liquid crystal display panel 102 and a second data signal for the second liquid crystal display panel 202. In addition, the gate signal generating unit 172 generates a first gate signal for the first liquid crystal display panel 102 and a second gate signal for the second liquid crystal display panel 202. The first data signal and the first gate signal are used for displaying a first sub-image in the first liquid crystal display panel 102, and the second data signal and the second gate signal are used for displaying a second sub-image in the second liquid crystal display panel 202.

The timing controlling unit 174 determines the timing for outputting the first and second data signals and the first and second gate signals. The panel selecting unit 176 selects one of the first and second liquid crystal display panels 102 and 202 using the sub-images. According to the selection of the panel selecting unit 176, the first data signal and the first gate signals are transmitted to the first data driver 166 and the first gate driver 164, respectively. In addition, the second data signal and the second gate signals are transmitted to the second data driver 266 and the second gate driver 264, respectively.

The first and second sub-images may be displayed in the same driving method or in different driving methods according to the timing controlling unit 174 and the panel selecting unit 176. For example, the first and second liquid crystal display panels 102 and 202 may be driven in parallel or in series. When the first and second liquid crystal display panels 102 and 202 are driven in parallel, the gate lines of the first liquid crystal display panel 102 and the gate lines of second liquid crystal display panel 202 may be sequentially selected at the same time. The $N^{th}$ gate line of the first liquid crystal display panel 102 and the $N^{th}$ gate line of the second liquid crystal display panel 202 may be selected at the same time, and then the $(N+1)^{th}$ gate line of the first liquid crystal display panel 102 and the $(N+1)^{th}$ gate line of the second liquid crystal display panel 202 may be selected at the same time. Next, the $(N+2)^{th}$ gate line of the first liquid crystal display panel 102 and the $(N+2)^{th}$ gate line of the second liquid crystal display panel 202 may be selected at the same time. In another driving method, after the $N^{th}$ gate line of the first liquid crystal display panel 102 is selected, the $N^{th}$ gate line of the second liquid crystal display panel 202 is selected.

When the first and second liquid crystal display panels 102 and 202 are driven in series, the gate lines of second liquid crystal display panel 202 may be sequentially selected after the gate lines of the first liquid crystal display panel 102 is sequentially selected. Accordingly, after finishing the sequential selection of the gate lines of the first liquid crystal display panel 102, the gate lines of the second liquid crystal display panel 202 are sequentially selected.

The first and second gate signals are transmitted to the first and second gate lines 114 and 214 (of FIG. 3), respectively. At the same time, the first and second data signals are transmitted to the first and second data lines 116 and 216, respectively. As a result, a better single image is displayed throughout the first and second liquid crystal display panels 102 and 202 as a whole.

Although the LCD device including first and second liquid crystal display panels 102 and 202 is illustrated, any number of liquid crystal display panels for the LCD device can be used as long as the display panels display a better single image. When an LCD device according to the present invention includes a plurality of liquid crystal display panels, the timing controller 160 converts and divides a single image by the RGB data and the control signals into a plurality of sub-images for the plurality of liquid crystal display panels, and generates a plurality of data signals and a plurality of gate signals. In addition, the timing controller 160 determines an output timing of the plurality of data signals and the plurality of gate signals, and the plurality of data signals and the plurality of gate signals are transmitted to the plurality of liquid crystal display panels. As a result, a better single image is displayed throughout the plurality of liquid crystal display panels as a whole.

In addition, the timing controller 160 may also respectively control a plurality of liquid crystal display panels to display different images at the same time. In other words, different liquid crystal display panels may simultaneously display different images not generated from the single image. For example, one of the liquid crystal display panels may display a picture and another liquid crystal display panel may display a text document or other file at the same time. The timing controller 160 may only send the corresponding data and gate signals to selected panel or panels associated with the picture and send the corresponding data and gate signals to selected panel or panels associated with the text document at the same time. In some circumstances, the scaling unit 165 and/or the dividing unit 168 may be disabled if the scaling and/or dividing of the image is not necessary.

An LCD device as shown in the illustrated embodiment may apply to a mobile device such as a cellular phone, a notebook computer, a personal digital assistant (PDA) and a navigation system.

Figure 6A:
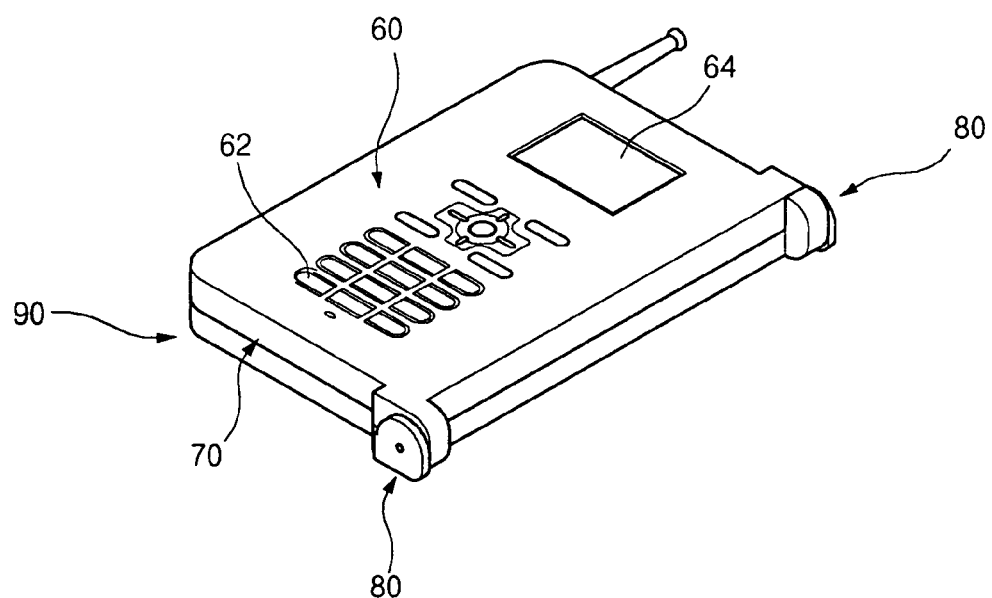
FIGS. 6A and 6B are schematic perspective views showing operating states of a mobile device according to an embodiment of the present invention.
Figure 6B:
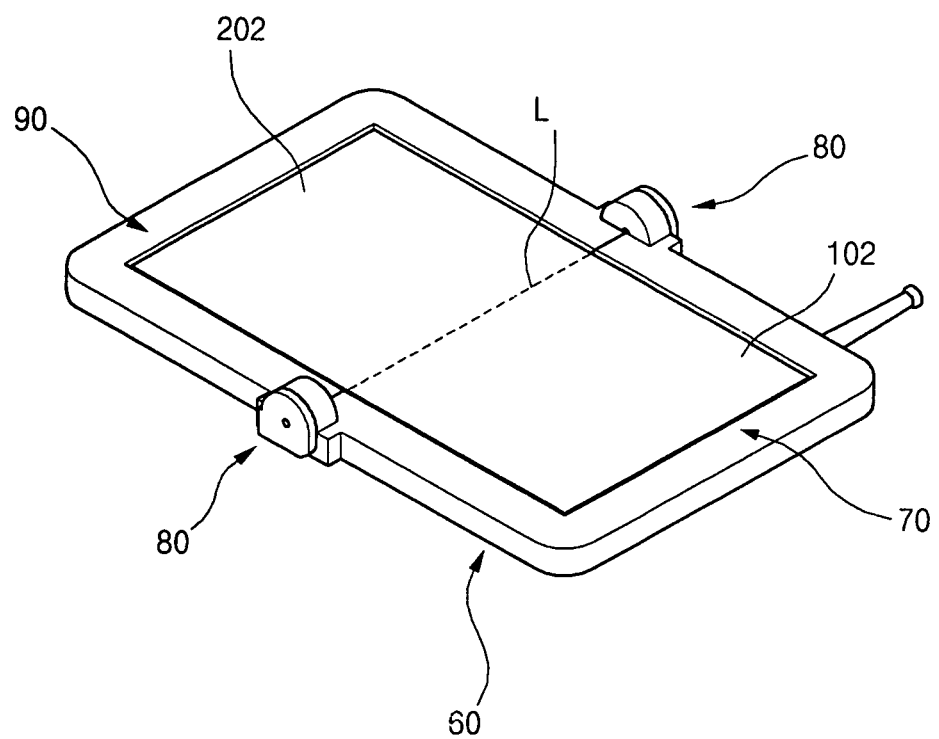

FIGS. 6A and 6B are schematic perspective views showing operating states of a mobile device according to an embodiment of the present invention. For example, a cellular phone is shown as a mobile device.

In FIGS. 6A and 6B, a mobile device includes a body unit 60 having an input device 62, a display unit 70 combined to the body unit 60, and an extended display unit 90 connected to the display unit 70 using a hinge 80. The display unit 70 is disposed on an opposite surface to the input device 62. Accordingly, as illustrated in FIG. 6A, the input device 62, such as a key pad, is disposed on a front surface of the body unit 60 when the mobile device is folded. Moreover, although not shown, one or more speakers are included in the mobile device in the case of cellular phones. Such speakers may include standard speakers for normal use, jacks for earphones, and loud speakers.

In addition, as illustrated in FIG. 6B, first and second liquid crystal display panels 102 and 202 attached to the display unit 70 and the extended display unit 90, respectively, constitute an area for displaying images when the mobile device 50 is unfolded. An additional flat panel display (FPD) 64 may be disposed on the front surface of the body unit 60 and spaced apart from the input device 62. The additional FPD 64 may be used for displaying images without unfolding the display unit 70 and the extended display unit 90.

The mobile device has a portable size by folding the display unit 70 and the extended display unit 90. In addition, the mobile device has a large display size by unfolding the display unit 70 and the extended display unit 90 and using a combined display area of the first and second liquid crystal display panels 102 and 202 for displaying images. An external driving system such as a graphic card and an interface board and the other elements of the LCD device such as a timing controller, a first gate driver, a first data driver, a second gate driver and a second data driver may be disposed in one of the body unit 60, the display unit 70 and the extended display unit 90. Accordingly, a better single image is displayed throughout the combined display area of the first and second liquid crystal display panels 102 and 202 in the mobile device having a portable size.

In another embodiment of the present invention, a mobile device may include at least three liquid crystal display panels. In addition, a mobile device may be a folder type where a display unit and a body unit are independently folded or unfolded, or a sliding type where a display unit and a body unit are independently slid from each other. Moreover, a mobile device of the present invention can apply to a monitor for displaying video contents such as in a cellular phone, a notebook computer, a personal digital assistant (PDA), a navigation system, a digital camera, a digital camcorder and a small-sized television.

In the illustrated LCD device, a better single image is displayed throughout a combined display area of a plurality of liquid crystal display panels using a single timing controller to control the plurality of liquid crystal display panels. In addition, since the better single image is obtained from the RGB data and control signals associated with the same image, the non-synchronization between the panels and an abnormality in picture change are prevented. In addition, the single timing controller may also control the plurality of liquid crystal display panels to simultaneously and respectively display different images not generated from the same image. Furthermore, since a single interface board, a single LVDS transmitting portion and a single LVDS receiving portion are used, a structure of an LCD device is simplified and a size for an LCD device is minimized. As a result, an LCD device according to the present invention may apply to a mobile device such as a cellular phone, a notebook computer, a personal digital assistant (PDA) and a navigation system where a plurality of liquid crystal display panels can be folded. Therefore, a mobile device can provide the portability with an increased display size.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
a graphic card for outputting RGB data and control signals of a transistor transistor logic (TTL) type for an image, wherein the graphic card includes a single low voltage differential signaling (LVDS) transmitting portion for converting the RGB data and the control signals into communication signals of an LVDS type;
a single timing controller for converting the RGB data and the control signals into a plurality of gate signals and a plurality of data signals;
a single interface board connected between the graphic card and the single timing controller, wherein the single interface board includes a single LVDS receiving portion for reconverting the communication signals of the LVDS type into the RGB data and the control signals of the TTL type;
wherein the single LVDS transmitting portion transmits the RGB data and the control signals of the graphic card, and the single LVDS receiving portion receives the RGB data and the control signals and transmits the RGB data and the control signals to the single timing controller; and
a plurality of display panels controlled by the single timing controller, for receiving the corresponding gate signals and data signals from the single timing controller, the plurality of display panels driven in parallel or series to display the image on a combined display area of the plurality of display panels as a whole,
wherein the single timing controller comprises:
a scaling unit for scaling the image to fit into the combined display area of the plurality of display panels;
a dividing unit for dividing the scaled image into a plurality of sub-images corresponding to the plurality of display panels, respectively;
a gate signal generating unit and a data signal generating unit generating the plurality of gate signals and the plurality of data signals for the plurality of display panels, respectively, corresponding to the plurality of sub-images; and
a timing controlling unit for determining timing for outputting the plurality of gate signals and the plurality of data signals to the plurality of display panels, wherein when the plurality of display panels are driven in parallel, gate lines of a first display panel of the plurality of display panels and gate lines of a second display panel of the plurality of display panels are sequentially selected at the same time in accordance with the determination made by the timing controlling unit, wherein when the plurality of display panels are driven in series, the gate lines of the second display panel are sequentially selected after the gate lines of the first display panel are sequentially selected in accordance with the determination made by the timing controlling unit, and wherein the RGB data increases by duplication to fit a plurality of pixels arranged in a horizontal line of the plurality of display panels in the scaling unit and the control signals are divided.

2. The device according to claim 1, wherein the single timing controller further comprises:
a reference signal generating unit for supplying a reference signal;
a transmission judging unit for judging a transmission of the RGB data and the control signals based on the reference signal; and
a panel selecting unit for selecting one of the plurality of display panels and outputting the corresponding gate signals and data signals to the selected one of the plurality of display panels.

3. The device according to claim 1, wherein each of the plurality of display panels includes a gate driver and a data driver, and wherein the plurality of gate signals are assigned to the corresponding gate drivers and the plurality of data signals are assigned to the corresponding data drivers.

4. The device according to claim 3, wherein each of the plurality of display panels is a liquid crystal display panel, and each of the plurality of display panels comprises:
a first substrate including the gate lines, data lines crossing the gate lines to define pixel regions, thin film transistors connected to the gate lines and the date lines, and pixel electrodes in the pixel regions; and
a second substrate facing the first substrate with a liquid crystal layer interposed therebetween, the second substrate including a black matrix having open portions exposing the pixel electrode, a color filter layer having red, green and blue sub-color filters corresponding to the open portions, and a common electrode on the color filter layer.

5. The device according to claim 4, wherein the plurality of gate signals are sequentially applied to the gate lines of each of the plurality of liquid crystal display panels.

6. The device according to claim 5, wherein the plurality of gate drivers of the plurality of liquid crystal display panels sequentially transmit the plurality of gate signals.

7. The device according to claim 5, wherein the plurality of gate drivers of the plurality of liquid crystal display panels simultaneously transmit the plurality of gate signals.

8. A mobile device having a display device, comprising:
a body having an input device;
a plurality of display units connected to the body, the plurality of display units connected to each other and movable with respect to each other;
a graphic card for outputting RGB data and control signals of a transistor transistor logic (TTL) type for an image, wherein the graphic card includes a single low voltage differential signaling (LVDS) transmitting portion for converting the RGB data and the control signals into communication signals of an LVDS type;
a single timing controller for converting the RGB data and the control signals into a plurality of gate signals and a plurality of data signals;
a single interface board connected between the graphic card and the single timing controller, wherein the single interface board includes a single LVDS receiving portion for reconverting the communication signals of the LVDS type into the RGB data and the control signals of the TTL type;
wherein the single LVDS transmitting portion transmits the RGB data and the control signals of the graphic card, and the single LVDS receiving portion receives the RGB data and the control signals and transmits the RGB data and the control signals to the single timing controller; and
a plurality of display panels controlled by the single timing controller, for receiving the gate signals and data signals from the single timing controller, wherein the plurality of display panels are disposed in the plurality of display units, respectively, and the plurality of display panels are driven in parallel or series to display the image on a combined display area of the plurality of display panels as a whole,
wherein the single timing controller comprises:
a scaling unit for scaling the image to fit into the combined display area of the plurality of display panels;
a dividing unit for dividing the scaled image into a plurality of sub-images corresponding to the plurality of display panels, respectively;
a gate signal generating unit and a data signal generating unit generating the plurality of gate signals and the plurality of data signals for the plurality of display panels, respectively, corresponding to the plurality of sub-images; and
a timing controlling unit for determining timing for outputting the plurality of gate signals and the plurality of data signals,
wherein when the plurality of display panels are driven in parallel, gate lines of a first display panel of the plurality of display panels and gate lines of a second display panel of the plurality of display panels are sequentially selected at the same time in accordance with the determination made by the timing controlling unit,
wherein when the plurality of display panels are driven in series, the gate lines of the second display panel are sequentially selected after the gate lines of the first display panel are sequentially selected in accordance with the determination made by the timing controlling unit, and
wherein the RGB data increases by duplication to fit a plurality of pixels arranged in a horizontal line of the plurality of display panels in the scaling unit and the control signals are divided.

9. The mobile device according to claim 8, wherein the body and one of the plurality of display units are integrally formed as one unit.

10. The mobile device according to claim 8, wherein the mobile device includes one of a cellular phone, a notebook computer, a personal digital assistant (PDA), and a navigation system.

11. The mobile device according to claim 8, wherein the graphic card and the single timing controller are disposed in one of the body and the plurality of display units.

12. The mobile device according to claim 8, wherein the single timing controller further comprises:
a reference signal generating unit for supplying a reference signal;

a transmission judging unit for judging a transmission of the RGB data and the control signals based on the reference signal; and a panel selecting unit for selecting one of the plurality of display panels and outputting the corresponding gate signals and data signals to the selected one of the plurality of display panels.

13. The mobile device according to claim 8, wherein the display device is a liquid crystal display device and the plurality of display panels are liquid crystal display panels.

* * * * *